United States Patent
Wu et al.

(10) Patent No.: US 9,253,068 B1
(45) Date of Patent: Feb. 2, 2016

(54) NETWORK APPLICATION CLASSIFICATION FOR NETWORK TRAFFIC MANAGEMENT

(71) Applicant: TREND MICRO INCORPORATED, Tokyo (JP)

(72) Inventors: Kuang-Yu Wu, Taipei (TW); Tzu-Chien Wu, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 379 days.

(21) Appl. No.: 13/774,166

(22) Filed: Feb. 22, 2013

(51) Int. Cl.
*G06F 15/16* (2006.01)
*H04L 12/26* (2006.01)
*H04L 29/06* (2006.01)
*H04L 12/801* (2013.01)

(52) U.S. Cl.
CPC .............. *H04L 43/10* (2013.01); *H04L 29/06* (2013.01); *H04L 63/166* (2013.01); *H04L 47/10* (2013.01)

(58) Field of Classification Search
CPC ............................... H04L 29/06; H04L 63/166
USPC ................... 709/219, 224, 245, 203; 370/252
See application file for complete search history.

(56) References Cited

U.S. PATENT DOCUMENTS

| | | | |
|---|---|---|---|
| 6,704,287 B1* | 3/2004 | Moharram | 370/242 |
| 7,882,268 B1* | 2/2011 | Broido | 709/245 |
| 8,289,864 B2 | 10/2012 | Dolganow et al. | |
| 8,291,058 B2 | 10/2012 | Head et al. | |
| 8,307,418 B2 | 11/2012 | Devdhar et al. | |
| 8,307,440 B1 | 11/2012 | Canion et al. | |
| 8,312,543 B1 | 11/2012 | Gardner | |
| 8,331,229 B1 | 12/2012 | Hu et al. | |
| 2004/0225895 A1* | 11/2004 | Mukherjee | H04L 12/4633 726/15 |
| 2009/0019524 A1* | 1/2009 | Fowler | H04L 9/3265 726/3 |
| 2011/0019574 A1* | 1/2011 | Malomsoky | H04L 41/5022 370/252 |
| 2011/0022707 A1* | 1/2011 | Bansal | H04L 67/22 709/224 |
| 2013/0268632 A1* | 10/2013 | Baron et al. | 709/219 |

* cited by examiner

*Primary Examiner* — Khanh Dinh
(74) *Attorney, Agent, or Firm* — Okamoto & Benedicto LLP

(57) ABSTRACT

Network traffic with encrypted packet payloads is classified based on monitored Domain Name System (DNS) query requests and responses. A network appliance, or some other computer, receives a DNS query request for a network name (e.g., host name) of a content server, and starts monitoring for a corresponding DNS query response. The network appliance receives the DNS query response and parses the DNS query response to retrieve an Internet Protocol (IP) address associated with the network name. The network appliance classifies the IP address as belonging to the content server or a network application associated with the content server. When the network appliance subsequently receives packets with a source or destination address that matches the IP address, the network appliance classifies the received packets as belonging to the content server or a network application associated with the content server.

15 Claims, 8 Drawing Sheets

| No. | Time | Source | Destination | Protocol | Length | Info |
|---|---|---|---|---|---|---|
| 21 | 12.620849 | 192.168.73.132 | 192.168.73.2 | DNS | 76 | standard query A v2p.keyholetv.jp |
| 23 | 12.899072 | 192.168.73.2 | 192.168.73.132 | DNS | 208 | standard query response A 122.220.4.234 |

| No. | Time | Source | Destination | Protocol | Length | Info |
|---|---|---|---|---|---|---|
| 24 | 13.244646 | 192.168.73.132 | 122.220.4.234 | DIS | 105 | PDUType: unknown |
| 26 | 13.588471 | 122.220.4.234 | 192.168.73.132 | DIS | 107 | PDUType: Create Entity |

NETWORK APPLICATION CLASSIFICATION FOR NETWORK TRAFFIC MANAGEMENT

BACKGROUND OF THE INVENTION

1. Field of the Invention

The present invention relates generally to network traffic management, and more particularly but not exclusively to methods and apparatus for classifying network applications.

2. Description of the Background Art

Deep Packet Inspection (DPI) is a technology that allows a network appliance or firewall to manage network activities by analyzing packet payloads. Compared to a traditional firewall, DPI provides more powerful features, such as layer 7 application control and non-IP (Internet Protocol)/port based protocol classification. Network appliances with a DPI engine are commercially available from Trend Micro, Inc., for example.

An important feature of DPI engines is protocol and network application classification by payload analysis. Protocol and network classification allows a DPI engine to classify network traffic, and enforce policies on the network traffic based on its classification. Unfortunately, protocol and network application classification by payload analysis only works well when the payload is not obfuscated, such as by encryption or encoding using an unknown algorithm. Without proper correlation about overall network behavior, protocol and network application classification may not even be feasible when the packet payloads are obfuscated.

SUMMARY

In one embodiment, network traffic with encrypted packet payloads is classified based on monitored Domain Name System (DNS) query requests and responses. A network appliance or some other computer receives a DNS query request for a network name (e.g., host name) of a content server, and starts monitoring for a corresponding DNS query response. The network appliance receives the DNS query response and parses the DNS query response to retrieve one or more Internet Protocol (IP) addresses associated with the network name. The network appliance classifies an IP address as belonging to the content server or a network application associated with the content server. When the network appliance subsequently receives packets with a source or destination address that matches the IP address, and in some embodiments other conditions (e.g., layer 4 protocol type, specific port number or port number range), the network appliance classifies the received packets as belonging to the content server or a network application associated with the content server.

These and other features of the present invention will be readily apparent to persons of ordinary skill in the art upon reading the entirety of this disclosure, which includes the accompanying drawings and claims.

DESCRIPTION OF THE DRAWINGS

FIG. 6 shows example DNS query request and corresponding DNS query response that may be detected by a network appliance.

FIG. 7 shows example connection setup packets from a client software and a content server.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
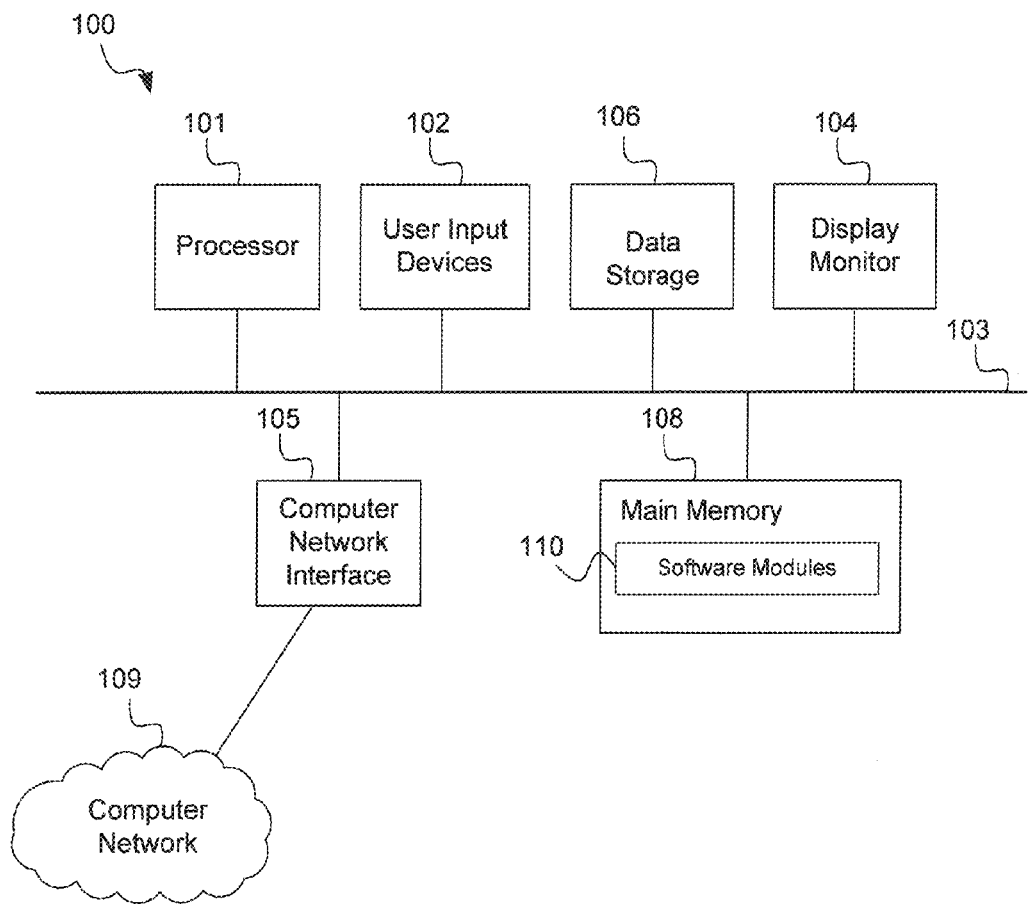
FIG. 1 shows a schematic diagram of a computer that may be employed with embodiments of the present invention.

Referring now to FIG. 1, there is shown a schematic diagram of a computer 100 that may be employed with embodiments of the present invention. The computer 100 may be employed as network appliance, and other computing devices described below. The computer 100 may have fewer or more components to meet the needs of a particular application. The computer 100 may include a processor 101. The computer 100 may have one or more buses 103 coupling its various components. The computer 100 may include one or more user input devices 102 (e.g., keyboard, mouse), one or more data storage devices 106 (e.g., hard drive, optical disk, Universal Serial Bus memory), a display monitor 104 (e.g., liquid crystal display, flat panel monitor, cathode ray tube), a computer network interface 105 (e.g., network adapter, modem), and a main memory 108 (e.g., random access memory). The computer network interface 105 may be coupled to a computer network 109, which in this example includes the Internet.

The computer 100 is a particular machine as programmed with software modules 110. The software modules 110 comprise computer-readable program code stored non-transitory in the main memory 108 for execution by the processor 101. The computer 100 may be configured to perform its functions by executing the software modules 110. The software modules 110 may be loaded from the data storage device 106 to the main memory 108.

Figure 2:
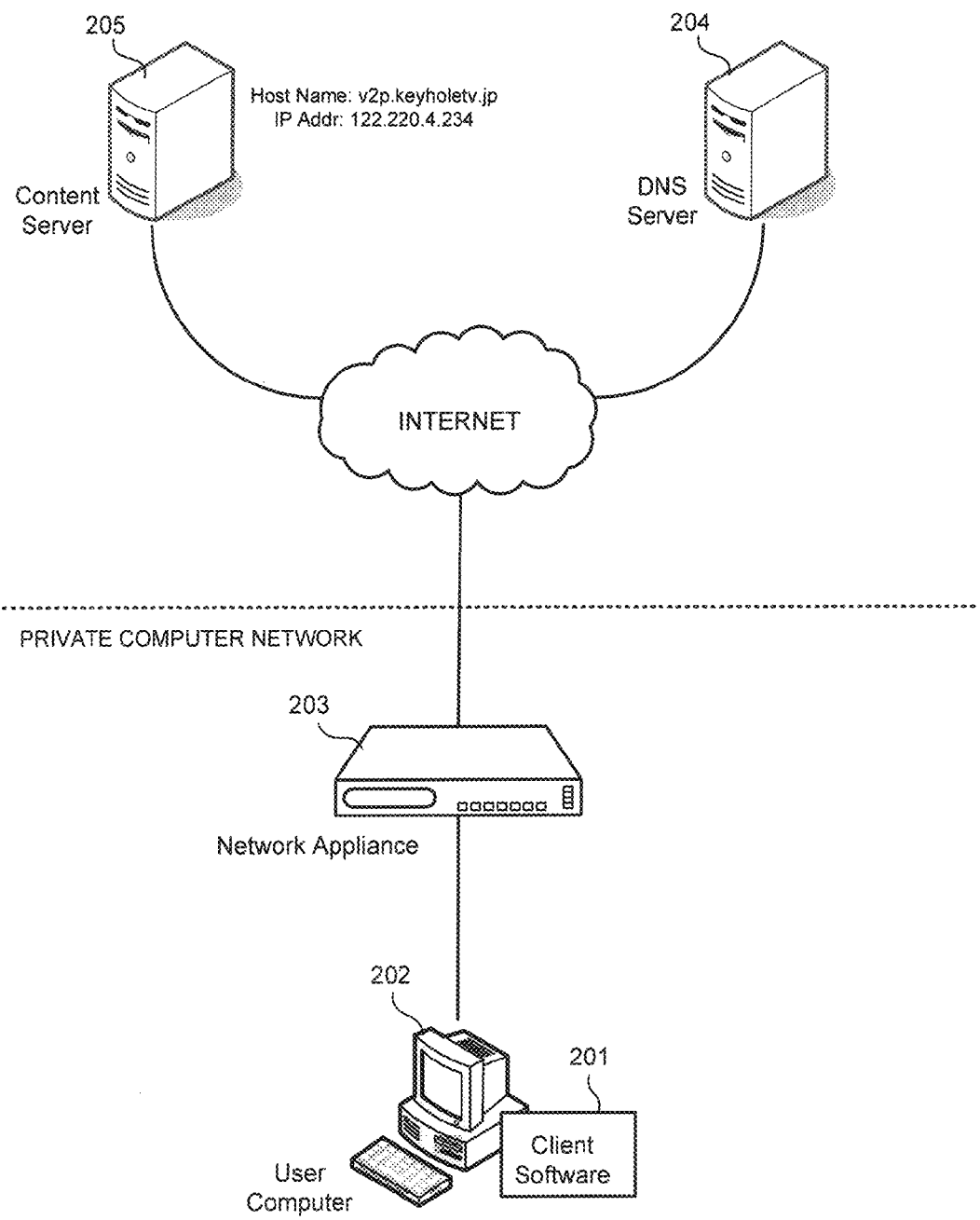
FIG. 2 shows a computing environment in accordance with an embodiment of the present invention.

FIG. 2 shows a computing environment in accordance with an embodiment of the present invention. In the example of FIG. 2, the computing environment includes a user computer 202, a network appliance 203, a Domain Name System (DNS) server 204, and a content server 205. The network appliance 203 and the user computer 202 may be part of and located within a private computer network. The DNS server 204 and the content server 205 may be accessible over the Internet. There is a plurality of content servers 205 on the Internet but only one is shown for clarity of illustration. In the example of FIG. 2, the content server 205 comprises a computer system that serves streaming video. The content server 205 may also be a website or other web server accessible over the Internet. Routers, switches, and other network devices are not shown for clarity of illustration. In the example of FIG. 2, the content server 205 streams video, or serves other content, to a client software 201 running on the user computer 202.

In the example of FIG. 2, the network appliance 203 comprises a computer that performs deep packet inspection to manage network activities by analyzing payloads of packets. The network appliance 203 receives packets of network traffic, and may analyze the payloads to classify the network traffic as belonging to a particular network application. As will be more apparent below, the network appliance 203 is operable to classify network traffic even when the packet payloads are encrypted or obfuscated in some other fashion. In cases where the packet payloads are encrypted, the network appliance may classify network traffic based on detected DNS query and responses.

In the example of FIG. 2, the network appliance 203 performs a gateway function and monitors all network traffic to and from the private computer network to enforce security policies. For example, the network appliance 203 may be operable to enforce a security policy to block connections to and from the content server 205 and other prohibited computer systems on the Internet. In particular, the network appliance 203 may be operable to block network traffic classified as belonging to the content server 205 or belonging to a network application associated with the content server 205, such as the client software 201 running on the user computer 202.

In the example of FIG. 2, the content server 205 is a server for "KeyHoleTV", and has a host name of "v2p.keyholetv.jp" and an IP address of "122.220.4.234". As can be appreciated, KeyHoleTV is used herein for illustration purposes only. Embodiments of the present invention may be generally employed to classify network traffic of other network applications.

A security policy of the private computer network is to block network traffic to any KeyHoleTV server, perhaps because the private computer network belongs to a corporation that wants to limit non-work-related network activity or because of some other reason. A problem with blocking network traffic to KeyHoleTV servers is that KeyHoleTV employs encrypted packet payloads. The packet payload encryption prevents conventional deep packet inspection from classifying the source or destination of KeyHoleTV network traffic. In particular, because the client software 201 transmits packets with encrypted payloads to the content server 205, conventional deep packet inspection has difficulty classifying the packets as belonging to KeyHoleTV.

Figure 3:
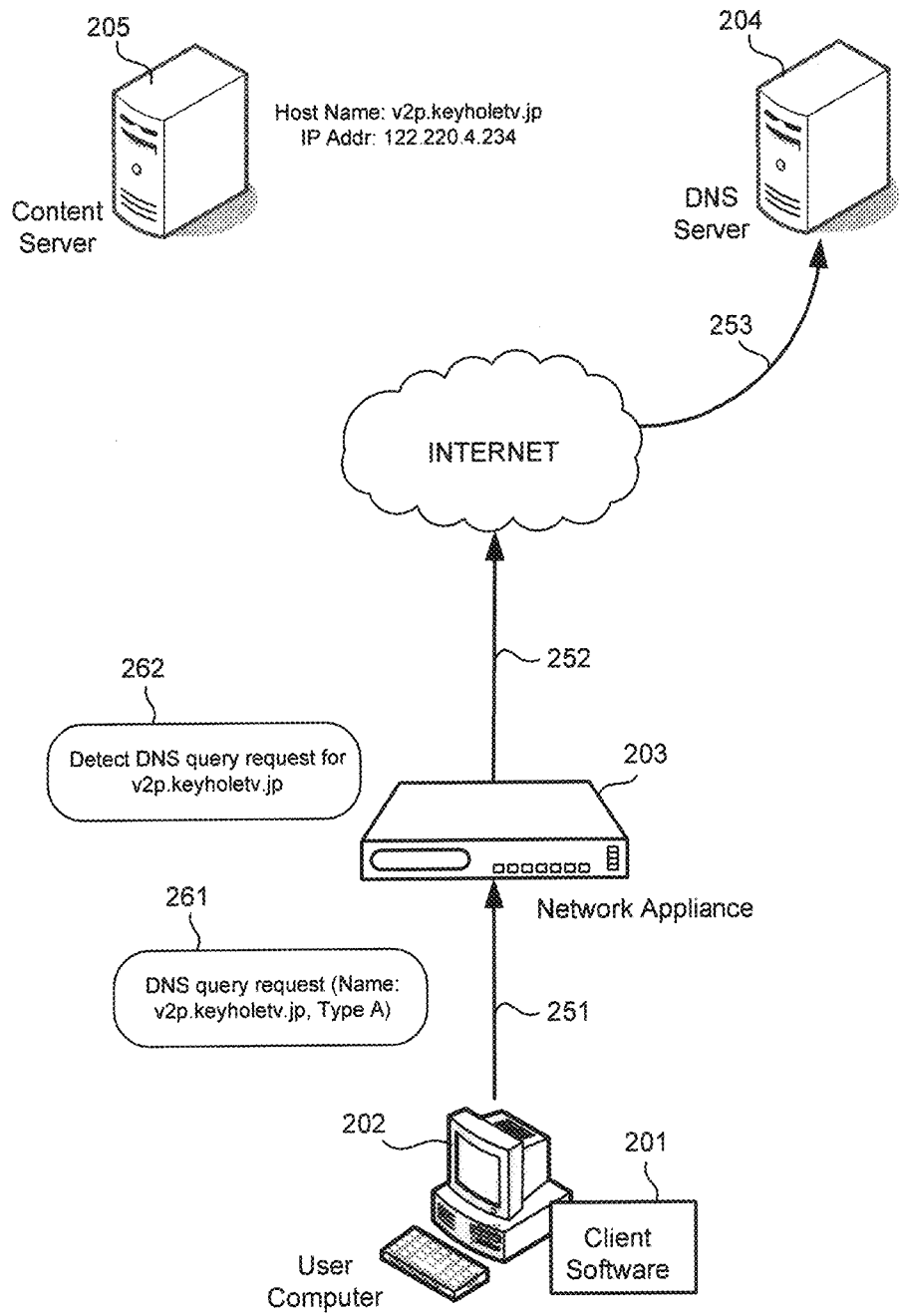
FIGS. 3-5 show flow diagrams that schematically illustrate an example operation of a network appliance in accordance with an embodiment of the present invention.
Figure 4:
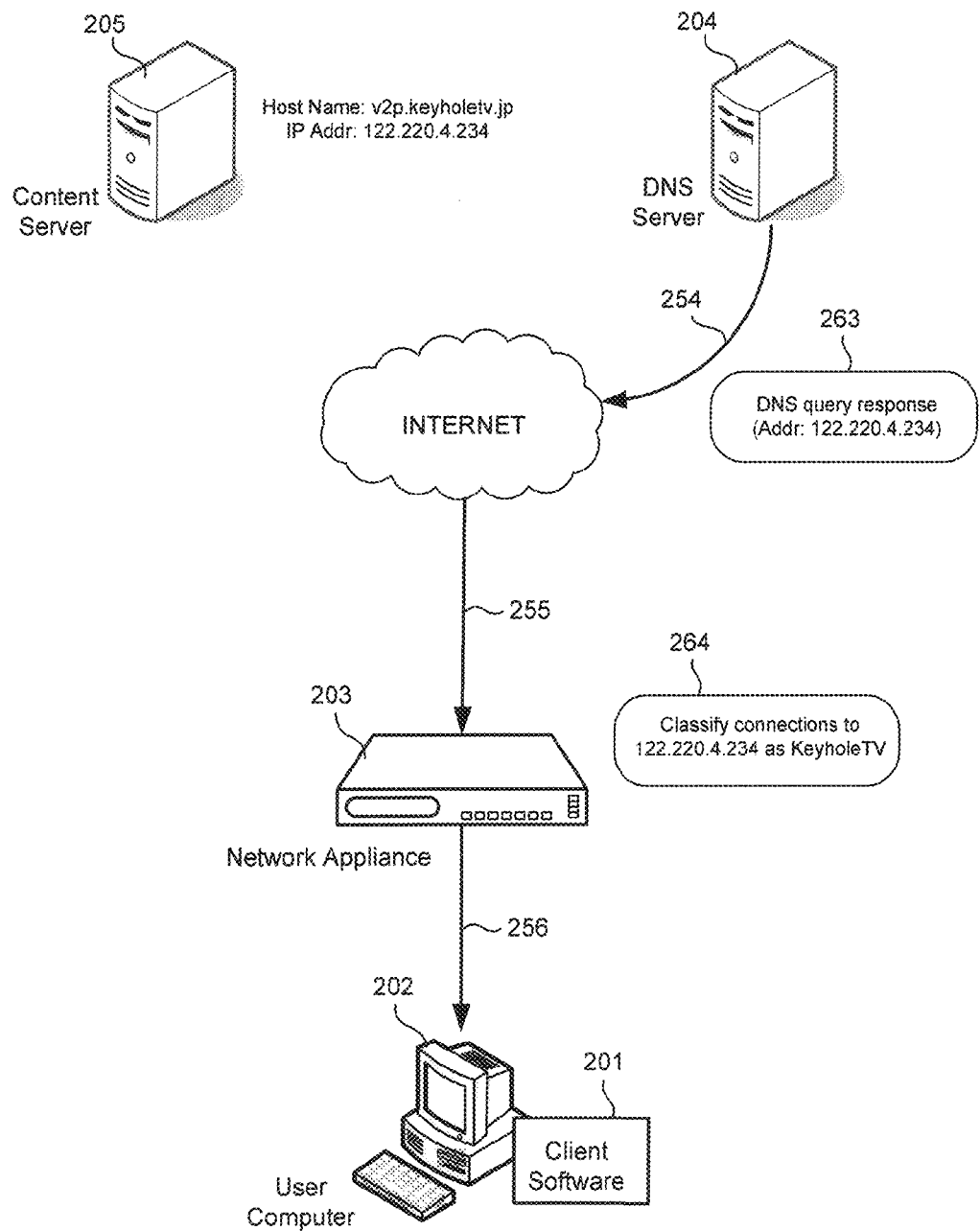
Figure 5:
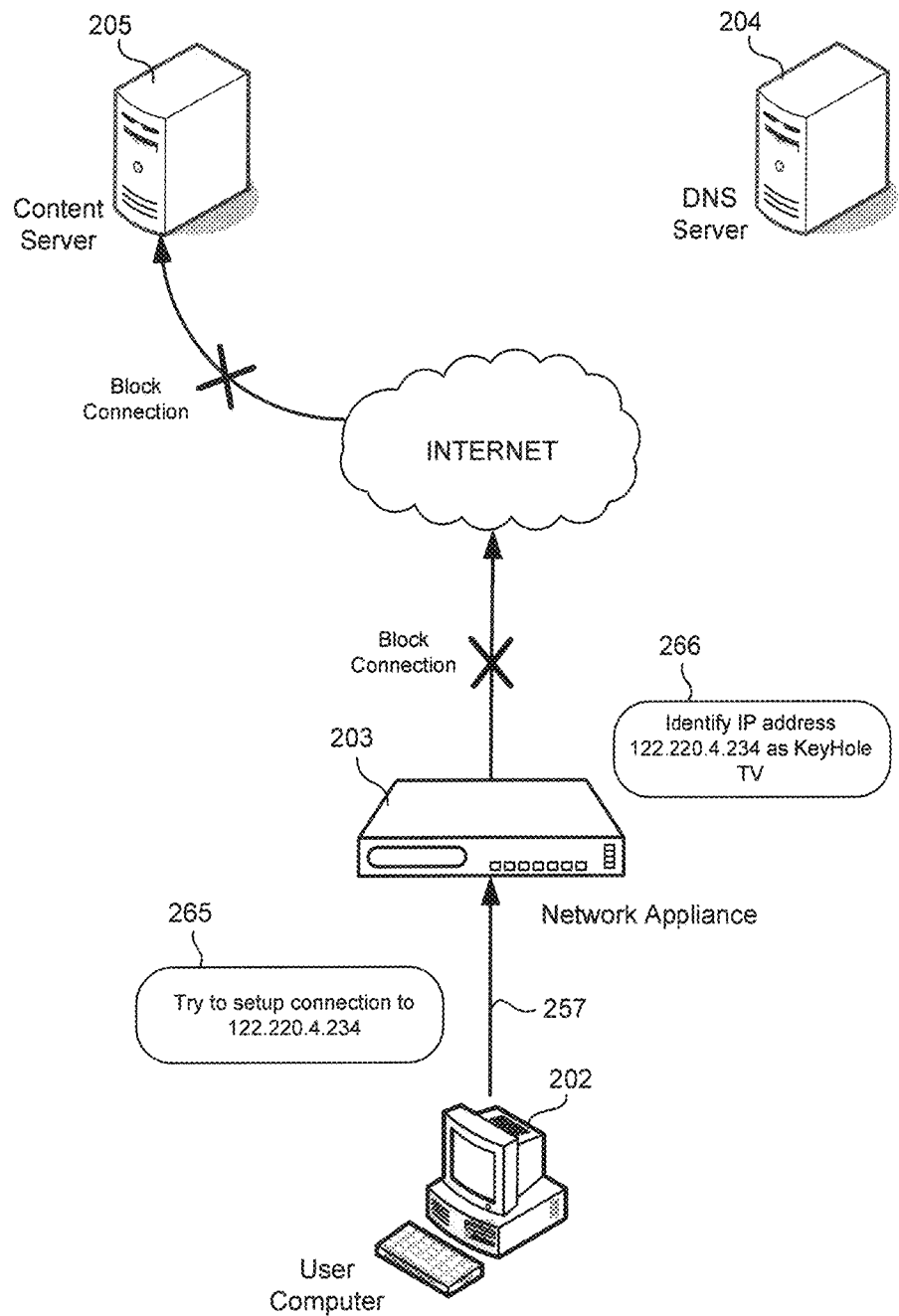

FIGS. 3-5 show flow diagrams that schematically illustrate an example operation of the network appliance 203 in accordance with an embodiment of the present invention. In the example of FIG. 3, the client software 201 initiates connection to KeyHoleTV by determining the IP address of the content server 205 (or some other KeyHoleTV content server). Accordingly, the client software 201 running on the user computer 202 sends a DNS query request for the host name of KeyHoleTV, which is "v2p.keyholetv.jp" in this example (see block 261). The DNS query request is received by the network appliance 203 from the user computer 202 (see arrow 251). In one embodiment, the network appliance 203 monitors DNS query requests Type A for IPv4 (Internet Protocol version 4) network traffic and DNS query requests Type AAAA for IPv6 (Internet Protocol version 6) network traffic.

In one embodiment, the network appliance 203 maintains a listing or database of network names, such as host names, of servers that are to be monitored in accordance with security policies. In the example of FIG. 3, the network appliance 203 is operable to block connections to KeyHoleTv, and accordingly has a listing of host names for KeyHoleTv servers. The network appliance 203 detects the DNS query request for "v2p.keyholetv.jp" (see block 262) and, in response, starts monitoring for a corresponding DNS query response that identifies the IP address associated with "v2p.keyholetv.jp". The network appliance 203 then forwards the DNS query request to the DNS server 204 over the Internet (see arrow 252). The DNS server 204 receives the DNS query request for "v2p.keyholetv.jp" (see arrow 253).

In the example of FIG. 4, the DNS server 204 processes the DNS query request for "v2p.keyholetv.jp" and sends a corresponding DNS query response (see block 263). The DNS query response includes the IP address of the server with the host name "v2p.keyholetv.jp". In this example, the content server 205 has the host name "v2p.keyholetv.jp" and an IP address of "122.220.4.234". Accordingly, the DNS query response has the IP address "122.220.4.234". The DNS server 204 sends the DNS query response over the Internet (see arrow 254). The network appliance 203, which has been waiting for the DNS query response, receives the DNS query response (see arrow 255) and retrieves the IP address from the DNS query response. The network appliance 203 classifies the IP address as KeyHoleTV. In particular, the network appliance 203 now classifies network traffic going to the IP address "122.220.4.234" as belonging to or originated by a network application associated with KeyHoleTV. The network appliance 203 thereafter forwards the DNS query response to the user computer 202 (see arrow 256), where the DNS query response is received by the client software 201.

In the example of FIG. 5, the client software 201 tries to set up a connection to the content server 205 to receive streaming video (see block 265). The client software 201 sends packets with encrypted payloads to the content server 205 to set up the connection (see arrow 257). The network appliance 203 receives the connection setup packets, which include the IP address of the content server 205. The IP address of the content server 205 is not in the payload section of the packets, and is therefore not encrypted. The network appliance 203 identifies the IP address of the content server 205, which is "122.220.4.234" in this example, as belonging to a network application classified as associated with KeyHoleTV (see block 266). Having classified the connection setup packets as being originated by a network application associated with KeyHoleTV, the network appliance 203 proceeds to enforce a security policy pertaining to KeyHoleTV. In this example, the security policy dictates blocking network traffic to KeyHoleTV. Accordingly, the network appliance 203 blocks the attempted network connection setup. In particular, the network appliance 203 blocks all network traffic going to or coming from a computer having the IP address "122.220.4.234".

FIG. 6 shows example DNS query request and corresponding DNS query response that may be detected by the network appliance 203. The example of FIG. 6 is a screen shot of WIRESHARK protocol analyzer capturing a DNS query request for the host name "v2p.keyholetv.jp" of the content server 205 (see arrow 270), and a corresponding DNS query response returning the IP address "122.220.4.234" of "v2p.keyholetv.jp" (see arrow 271). The network appliance 203 may readily detect the host name from the DNS query and obtain the IP address associated with the host name from the DNS query response.

FIG. 7 shows example connection setup packets from the client software 201 and the content server 205. The example of FIG. 7 is a screen shot of WIRESHARK protocol analyzer capturing connection setup packets sent by the client software 201 to the IP address "122.220.4.234" of the content server 205 (see arrow 272), and a responsive connection setup packets from the IP address "122.220.4.234" of the content server 205 (see arrow 273). The network appliance 203 may readily detect and block network traffic to and from the content server 205 by looking for packets having a source or destination IP address of "122.220.4.234". In this example, the network appliance 203 blocks network traffic sent by the client software 201 to the IP address of "122.220.4.234".

Figure 8:
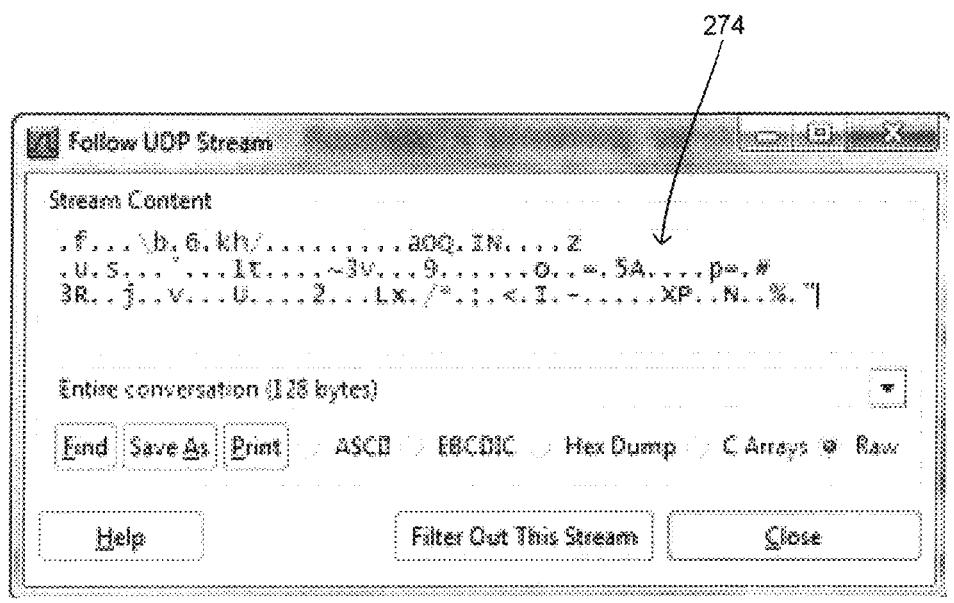
FIG. 8 shows an example screen shot of a protocol analyzer capturing payloads of packets from a content server.

FIG. 8 shows an example screen shot of WIRESHARK protocol analyzer capturing payloads of packets from a KeyHoleTV server. The payloads may contain a server list that allows the client software 201 to connect to a particular KeyHoleTV server to receive streaming video. Because the payloads are encrypted (see arrow 274), conventional means of analyzing the payloads to identify servers or to obtain other information is very difficult, if not impossible.

Figure 9:
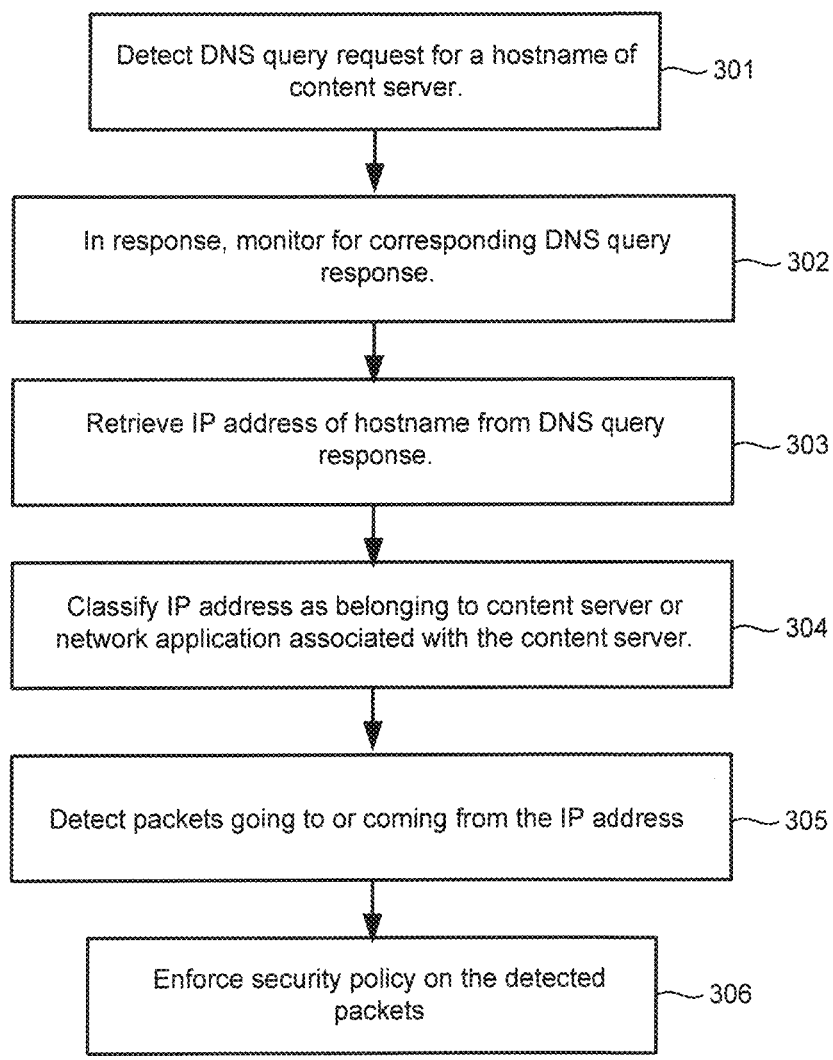
FIG. 9 shows a flow diagram of a method of controlling computer network traffic in accordance with an embodiment of the present invention.

FIG. 9 shows a flow diagram of a method of controlling computer network traffic in accordance with an embodiment of the present invention. The method is explained as being performed by the network appliance 203 for illustration purposes only. As can be appreciated, the method may be performed by other computing devices to classify packets transmitted over a computer network.

In the example of FIG. 9, the network appliance 203 detects a DNS query request for a network name, such as a host name, of a content server 205 (step 301). In response to detecting the DNS query request for the host name, the network appliance 203 starts monitoring for the corresponding DNS query response that is responsive to the DNS query request (step 302). The network appliance 203 detects the DNS query response, and parses the DNS query response to retrieve the IP address associated with the host name from the DNS query response (step 303). The network appliance classifies the IP address as belonging to content server 205 or network application (e.g., client software 201) associated with the content server 205 (step 304). The network appliance 203 detects packets with encrypted payloads and having a source or destination address that matches the IP address (step 305). The network appliance 203 accordingly classifies the packets as belonging to the content server or from a network application associated with the content server. The network appliance 203 blocks the packets or performs some other action dictated by security policy pertaining to the content server 205 (step 306).

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of controlling computer network traffic, the method comprising:
    receiving a Domain Name System (DNS) query request for a network name of a content server;
    in response to receiving the DNS query request, monitoring for a corresponding DNS query response that is responsive to the DNS query request;
    receiving the DNS query response;
    retrieving from the DNS query response an Internet Protocol (IP) address associated with the network name;
    classifying the IP address as belonging to a network application associated with the content server;
    forwarding the DNS query response to a user computer that sent out the DNS query request;
    after forwarding the DNS query response to the user computer that sent out the DNS query request, receiving network traffic with encrypted packet payloads;
    in response to determining that the network traffic includes packets having a source or destination address that matches the IP address, classifying the network traffic as belonging to the network application associated with the content server; and
    in response to classifying the network traffic as belonging to the network application associated with the content server, enforcing a security policy on the network traffic, wherein the security policy includes blocking the network traffic.

2. The method of claim 1 wherein the network name comprises a host name.

3. The method of claim 1 wherein the network application comprises a client software running on the user computer.

4. The method of claim 1 wherein the content server serves streaming video.

5. The method of claim 1 wherein the method is performed by a network appliance that provides a gateway function in a private computer network that includes the user computer.

6. A computer network comprising:
    a user computer that runs a client software for accessing a content server and sends a Domain Name System (DNS) query request initiated by the client software, the DNS query request being a request for Internet Protocol (IP) address associated with a network name of the content server; and
    a network appliance that detects the DNS query request, starts monitoring for a corresponding DNS query response in response to detecting the DNS query request, forwards the DNS query request to a DNS server, receives the DNS query response sent by the DNS server, retrieves the IP address from the DNS query response, classifies the IP address as belonging to a network application associated with the content server, detects and classifies received packets having a destination address that matches the IP address as belonging to the network application after forwarding the DNS query response to the user computer, and enforces a security policy on the received packets,
    wherein the security policy includes blocking the received packets.

7. The computer network of claim 6 wherein the network name comprises a host name.

8. The computer network of claim 6 wherein the received packets have encrypted payloads.

9. The computer network of claim 6 wherein the content server serves streaming video.

10. The computer network of claim 6 wherein the network appliance provides a gateway function in the computer network.

11. A method of controlling computer network traffic, the method comprising:
    a first computer sending a Domain Name System (DNS) query request for a network name of a content server;
    a second computer receiving the DNS query request;
    in response to receiving the DNS query request, the second computer monitoring for a corresponding DNS query response;
    the second computer forwarding the DNS query request to a DNS server;
    the second computer receiving the DNS query response that is sent by the DNS server;
    the second computer retrieving an Internet Protocol (IP) address from the DNS server;
    the second computer classifying the IP address as belonging to a network application associated with the content server;
    the second computer forwarding the DNS query response to the first computer;

after forwarding the DNS query response to the first computer, the second computer receiving packets with encrypted packet payloads and having a destination address that matches the IP address;

the second computer classifying the received packets as belonging to the network application associated with the content server; and the second computer enforcing a security policy pertaining to the content server on the received packets, wherein the security policy includes blocking the received packets.

12. The method of claim 11 wherein the network name comprises a host name.

13. The method of claim 11 wherein the content server serves streaming video.

14. The method of claim 11 wherein the second computer provides a gateway function to the first computer and other computers on a private computer network.

15. The method of claim 11 wherein the network application is a client software of the content server running in the first computer.

\* \* \* \* \*